(12) United States Patent
Kiss et al.

(10) Patent No.: US 8,791,821 B2
(45) Date of Patent: Jul. 29, 2014

(54) METER MAINTENANCE AND TAMPERING DETECTION SYSTEM AND METHOD

(75) Inventors: Zoltan Kiss, Los Altos, CA (US); Petros Raptis, Hayward, CA (US)

(73) Assignee: Silver Spring Networks, Inc., Redwood City, CA (US)

( * ) Notice: Subject to any disclaimer, the term of this patent is extended or adjusted under 35 U.S.C. 154(b) by 278 days.

(21) Appl. No.: 13/331,658

(22) Filed: Dec. 20, 2011

(65) Prior Publication Data

US 2013/0154833 A1    Jun. 20, 2013

(51) Int. Cl.
*G08B 13/08* (2006.01)

(52) U.S. Cl.
USPC ............. 340/545.1; 340/870.02; 340/870.09; 340/540

(58) Field of Classification Search
USPC ............ 340/870.02, 870.09, 500, 540, 545.1, 340/545.4, 508, 606, 568.1; 273/138.1; 702/60, 61, 182; 73/201; 324/76.11, 324/110; 370/252, 400, 401
See application file for complete search history.

(56) References Cited

U.S. PATENT DOCUMENTS

| | | | | |
|---|---|---|---|---|
| 4,337,466 | A * | 6/1982 | Spahn | 340/870.09 |
| 6,236,197 | B1 * | 5/2001 | Holdsclaw et al. | 324/110 |
| 2010/0141474 | A1 * | 6/2010 | Ehrke et al. | 340/870.02 |

* cited by examiner

*Primary Examiner* — Anh V La
(74) *Attorney, Agent, or Firm* — Patterson & Sheridan, LLP (57) ABSTRACT

Methods, systems, and devices for managing an end-device connected to a commodity delivery network. One device includes computer-readable medium containing instructions for managing the end-device and a processor for executing the instructions. The instructions include instructions for detecting tampering of the end-device, ignoring the detected tampering when the end-device has been placed in an ignore mode, and automatically disconnecting the end-device from the commodity delivery system based on the detected tampering when the end-device has not been placed in the ignore mode.

25 Claims, 7 Drawing Sheets

METER MAINTENANCE AND TAMPERING DETECTION SYSTEM AND METHOD

BACKGROUND

The present invention relates to commodity delivery networks and related devices, systems, and methods, and particularly to devices, systems, and methods for managing detected tampering of such devices.

SUMMARY

In one embodiment, the invention provides a computer-implemented method for managing an end-device connected to a commodity delivery system where the end-device is included in an enclosure including a door. The method is performed by a network interface controller and includes determining if the door is open and, when the door is open, determining if the end-device is in an ignore mode. The method further includes automatically disconnecting the end-device from the commodity delivery system when the door is open and the end-device is not in an ignore mode and maintaining a current operating state of the end-device when the door is open and the end-device is in an ignore mode.

In another embodiment the invention provides a system for managing an end-device connected to a commodity delivery network, where the end-device is included in an enclosure having a door. The system includes a network interface controller. The network interface controller is configured to determine if the door is open, determine if the end-device is in an ignore mode, automatically disconnect the end-device from the commodity delivery system when the door is open and the end-device is not in an ignore mode, and maintain a current operating state of the end-device when the door is open and the end-device is in an ignore mode.

In another embodiment the invention provides a device for managing an end-device connected to a commodity delivery network. The device includes computer-readable medium containing instructions for managing the end-device and a processor for executing the instructions. The instructions include instructions for detecting tampering of the end-device, ignoring the detected tampering when the end-device has been placed in an ignore mode, and automatically disconnecting the end-device from the commodity delivery system based on the detected tampering when the end-device has not been placed in the ignore mode.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
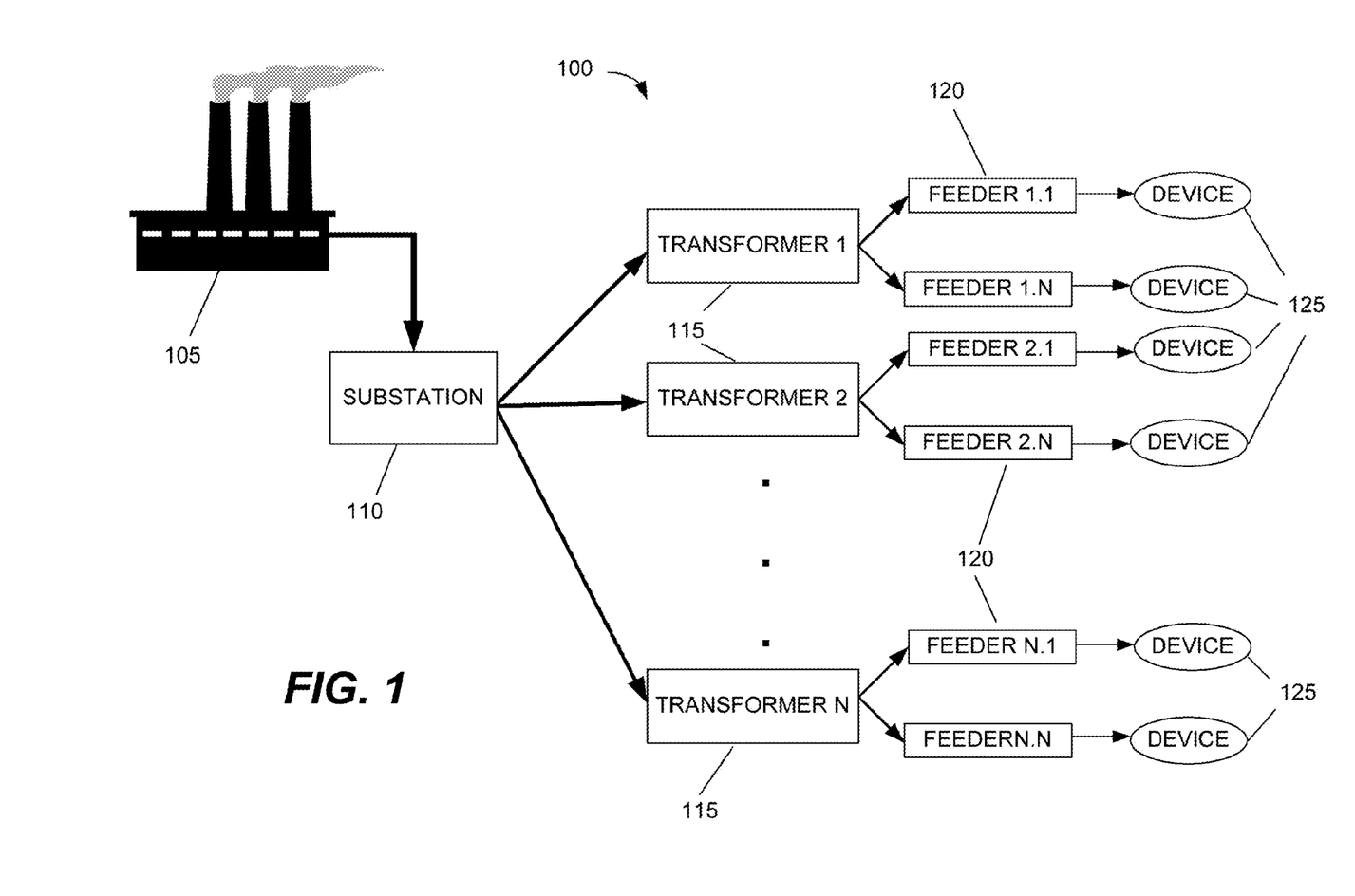
FIG. 1 is a schematic diagram of a commodity delivery network.

FIG. 1 shows an exemplary commodity delivery network 100. The commodity delivery network 100 in this example is for delivering electricity to end-users (e.g., homes, businesses, etc.). The delivery network 100 includes a power generation plant 105, a plurality of substations 110 that receive high-voltage power from the power generation plant 105, a plurality of transformers 115, a plurality of feeders or laterals 120, and a plurality of end-devices 125 (e.g., a smart electric meter). The power generation plant 105 generates electricity and provides high-voltage power to the substations 110. The substations 110 step down the received voltage, and supply the stepped-down voltage to the transformers 115. The transformers 115 again step down the voltage and supply this voltage, via the feeders/laterals 120, to end-users (e.g., residential buildings) through the end-devices 125. The end-devices 125 monitor, and in some cases control, usage of the commodity by the end-users.

Figure 2:
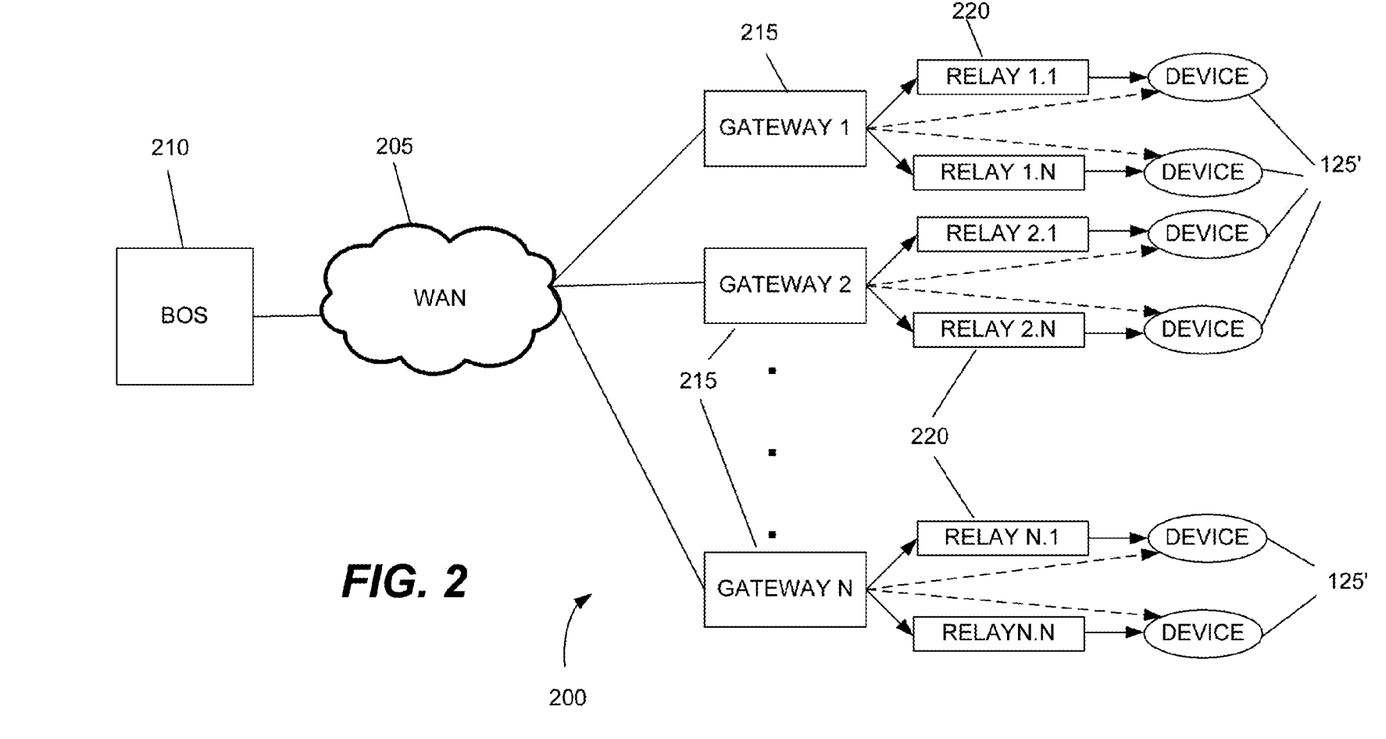
FIG. 2 is a schematic diagram of a communication network overlaid on the commodity delivery network of FIG. 1.

FIG. 2 shows an exemplary construction of the communication network 200 which overlays the delivery network 100. The communication network 200 enables communication between the commodity provider (e.g., the power generation plant 105) and the components of the delivery network 100 (e.g., the plurality of substations 110, the plurality of transformers 115, the plurality of feeders or laterals 120, and the plurality of end-devices 125). The communication network 200 can include a wide-area-network (WAN) 205, via which a back office 210 of the commodity provider communicates with a local-area-network (LAN). The LAN includes a plurality of gateways 215, a plurality of relays 220, and a plurality of end-devices 125'. The components of the delivery network 100 can perform one or more of the communication network 200 functions (e.g., the gateway 215, the relay 220, and the end-device 125' functions), or they can perform none of the communication network 200 functions. In addition, one or more of the gateways 215 and/or relays 220 can perform communication network functions but not any commodity delivery functions.

U.S. Pat. No. 7,853,417 filed on May 17, 2007, and entitled "Methods and System for Utility Network Outage Detection," the entire contents of which is hereby incorporated by reference, describes operation of an exemplary communication network 200 in greater detail. In addition, the invention can be practiced using other communication network constructions. For example, U.S. patent application Ser. No. 12/510,168 filed on Jul. 27, 2009, and entitled "Meshed Networking of Access Points in a Utility Network," and U.S. patent application Ser. No. 12/167,592 filed on Jul. 3, 2008, and entitled "Network Utilities in Wireless Mesh Communications Networks," the entire contents of both being hereby incorporated by reference, disclose mesh communication networks for use in commodity delivery networks.

Figure 3:
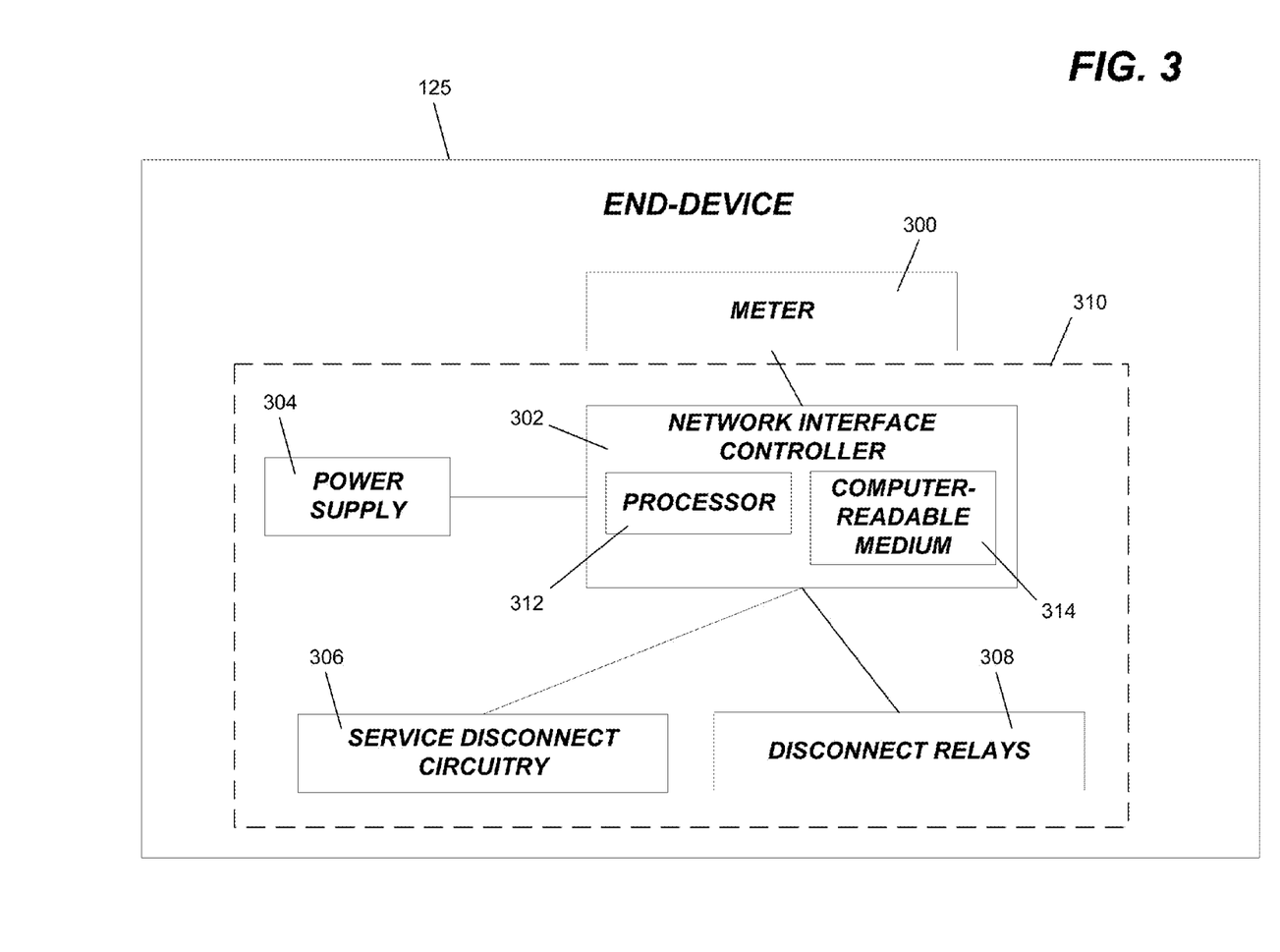
FIG. 3 is a schematic diagram of an end-device for the commodity delivery network of FIG. 1.

FIG. 3 illustrates an end-device 125 according to some embodiments of the present invention. It should be understood that the end-device 125 can also represent an end-device 125' as illustrated in FIG. 2. In general, the end-device 125 can include components and functionality to connect with and interact with the commodity delivery network 100 and the communication network 200. Also, it should be understood that FIG. 3 illustrates only one example of components included in an end-device 125, and that other configurations are possible. As shown in FIG. 3, the end-device 125 includes a meter 300, a network interface card or controller ("NIC") 302, a power supply 304, service disconnect circuitry 306, and disconnect relays 308. The meter 300 monitors and, in some cases, controls the amount of the commodity (e.g., electricity) passing through the end-device 125, which represents commodity usage of a particular end-user. In some embodiments, the meter 300 also includes a meter interface box 310 ("MIB") that houses the NIC 302, the power supply 304, the service discount circuitry 306, and the disconnect relays 308.

The power supply 304 in the illustrated embodiment of FIG. 3 supplies power to the NIC 302 and/or the meter 300. In some embodiments, the power supply 304 serves as a backup power supply for the end-device 125 when electricity delivered over the commodity delivery network 100 is unavailable (e.g., during a power outage or when the end-device 125 is disconnected from the network 100). The NIC 302 can include a processor 312 and computer-readable medium 314. The computer-readable medium 314 includes non-transitory computer readable medium and includes volatile memory, non-volatile memory, or a combination thereof. The computer-readable medium 314 stores instructions executable by the processor 312 to manage the end-device 125. For example, the instructions can include instructions for communicating with the meter 300 (e.g., collect data and issue commands) and communicating with other devices and systems over the communication network 200 (e.g., the back office 210). For example, the NIC 302 can be configured to collect data from the meter 300 (i.e., "read" the meter 300) continuously or at predetermined times (hereinafter referred to as "meter data") and transmit the meter data (either raw or after processing the data) over the communications network 200 to the back office 210. The commodity provider uses the meter data to charge an end-user based on their usage of the commodity. It should be understood that in some embodiments, the NIC 302 can communicate with a plurality of meters 300. For example, the NIC 302 can be located external to an end-device 125 and can communicate with a plurality of end-devices 125 and, subsequently, a plurality of meters 300. Alternatively, an end-device 125 can include multiple meters 300 and one or more NICs 302 for managing the meters 300.

The service disconnect circuitry 306 and the disconnect relays 308 allow the end-device 125 to be safely disconnected from the commodity delivery network 100. It should be understood that in some embodiments, the relays 308 can be included in the circuitry 306. Also, in some embodiments, the circuitry 306 and/or the relays 308 can be located external to an end-device 125 and can be used to disconnect a group of end-devices 125 from the network 100. Furthermore, in some embodiments, the service disconnect circuitry 306 and the disconnect relays 308 can also be used to connect the end-device 125 to the network 100. In other embodiments, the end-device 125 can include additional components to connect the end-device 125 to the network 100. It should be understood that in some embodiments the meter 300 is configured to perform or manage the actual disconnection or connection through the circuitry 306 and the relays 308. For example, the NIC 302 can send a "disconnect" command or a "connect" command to the meter 300 and the meter 300 can perform or manage the actual disconnection or connection. The meter 300 can be configured to perform various checks to ensure that the end-device 125 can be properly and safely disconnected from or connected to the network 100 and, in some embodiments, can determine whether a disconnection or a connection has been successfully performed. The meter 300 can report any errors occurring during a disconnection or a connection to the NIC 302. The NIC 302 can also be configured to poll the meter 300 to determine if a disconnection or a connection was successfully performed. The NIC 302 can store any data received from the meter 300 in the computer-readable medium 314 as part of an audit log (as described below in more detail).

Figure 4:
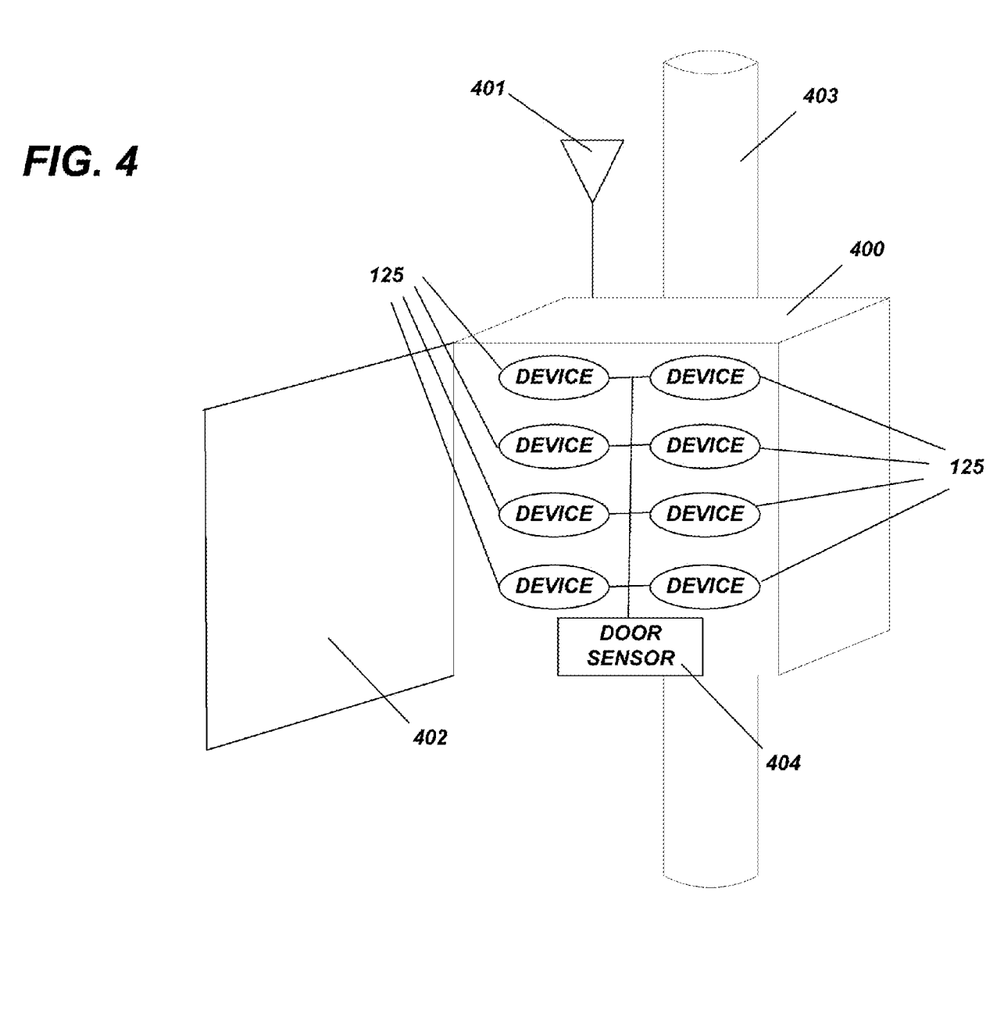
FIG. 4 is a schematic diagram of a plurality of end-devices included in an enclosure.

In some embodiments, as shown in FIG. 4, one or more end-devices 125 are placed within a cabinet or enclosure 400. The end-devices 125 can be placed within the enclosure 400 to provide increased security for the end-devices 125. The enclosure 400 can be constructed from metal or other suitable material, and in some embodiments can contain one to six end-devices 125. In some embodiments, the enclosure 400 can include an external antenna 401 that transmits and receives data over the communications network 200. At least one end-device 125 located within the enclosure 400 can be connected to the external antenna 401 and, therefore, can use the external antenna 401 to transmit and receive data over the communications network 200. In addition to or as an alternative to using the external antenna, each end-device 125 included in the enclosure 400 can use a respective internal antenna to transmit and receive data over the communication network 200. The back office 210 can keep track of the end-devices 125 included in a particular enclosure 400 (e.g., by serial number), such that the back office 210 can transmit data (e.g., signals, commands, data, etc.) to specific end-devices 125 and/or all end-devices 125 included in a particular enclosure 400.

As shown in FIG. 4, the enclosure 400 can include a door 402 that can be opened to access the end-devices 125. To provide extra security, the door 402 can be locked (e.g., with a keyed lock, a combination lock, an electronic lock, etc.). For additional security, the enclosure 400 can also be placed in a generally inaccessible location, such as in a high position on a utility pole 403 used to distribute electricity through the commodity delivery network 100.

Even with the added security of the locked enclosure 400 and its elevated location, individuals may attempt to access the enclosure 400 to steal utilities. To deter such behavior, the enclosure 400 can be equipped with a door sensor 404 that signals when the door 402 is open and closed. Any number or all of the end-devices 125 included in the enclosure 400 can be connected to the door sensor 404 (e.g., either directly or through a shared connection or bus) and can receive "open" and "closed" signals from the door sensor 404. If the end-devices 125 receive an "open" signal from the door sensor 404, the end-devices 125 can be configured to disconnect from the commodity delivery network 100.

The end-devices 125 can remain disconnected from the network 100 until the detected tampering is addressed. For example, in some embodiments, the end-devices 125 are configured to automatically reconnect to the network 100 after the door 402 has been closed. In other embodiments, even if the door 402 is closed, the end-devices 125 are configured to remain disconnected from the network 100 until a "connect" command is received from the back office 210 or another device connected to the network 200 and/or until maintenance personnel visit the enclosure 400 and connect the end-devices 125 to the network 100.

With all of the end-devices 125 included in the enclosure 400 disconnected from the commodity delivery network 100, an individual breaking into the enclosure 400 cannot steal a commodity, such as electricity. Furthermore, by disconnecting all of the end-devices 125 included in the enclosure 400, commodity users associated with the disconnected end-devices 125 may notice the loss of power and may inspect the enclosure 400 and witness or identify the tampering event. This information can be used to apprehend individuals attempting to steal the commodity. Furthermore, the knowledge that multiple end-users will be notified of tampering may deter individuals from attempting to tamper with the enclosure 400 in the first place.

In addition, the end-devices 125 (e.g., the NIC 302) can be configured to keep an audit log of detected tampering (e.g., in the computer-readable medium 314). For example, the NIC 302 can create an audit log entry any time the end-device 125 is disconnected from the network 100 due a signal received from the door sensor 404. The audit log can include a time and a date of the disconnection. The audit log can also include the time and the date of any "open" signals and/or "closed" signals received from the door sensor 404. Each NIC 302 can be configured to transmit the audit log to the back office 210, where it can be used to (i) identify potential tampering, (ii) identify connection needs, (iii) track maintenance response times, and/or (iv) identify end-devices 125 or enclosures 400 having a history of repeated tampering, etc.

There are situations, however, where the door 402 of the enclosure 400 needs to be opened for legitimate purposes, such as for maintenance purposes. Furthermore, there may be situations where it is undesirable to disconnect end-devices 125 associated with particular end-users, such as medical clinics, government offices, important commodity customers, etc., even when an enclosure 400 is breached. In these situations, it is desirable to keep one or more of the end-devices 125 included in the enclosure 400 connected to the commodity network 100 even after the door 402 is opened.

To accomplish this, the back office 210 (or another authorized device connected to the communications network 200) can send an "ignore" command to one or more of the end-devices 125 included in an enclosure 400. The "ignore" command instructs the end-device 125 to maintain its current operating state regardless of the signals received from the door sensor 404. Similarly, the back office 210 can a "stop ignoring" command to an end-device 125 to instruct the end-device 125 to stop ignoring signals received from the door sensor 404.

Figure 5:
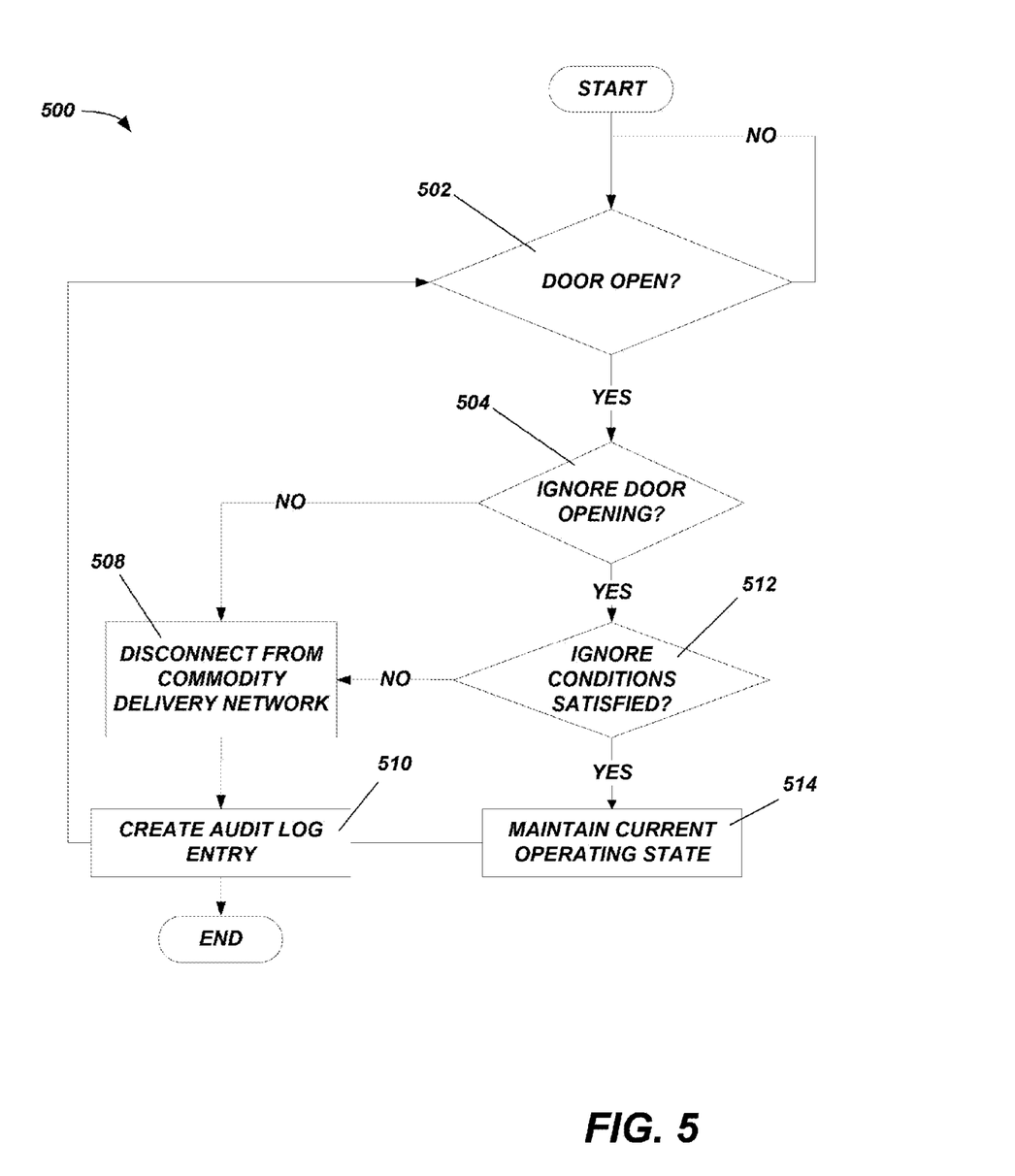
FIG. 5 is a flow chart illustrating a process for managing detected tampering of an end-device.

For example, FIG. 5 illustrates a process performed by the NIC 302 to manage detected tampering of an enclosure 400 containing a plurality of end-devices 125. As shown in FIG. 5, the process 500 includes determining if the door 402 of the enclosure 400 has been opened (at 502). As described above, the door sensor 404 provides "open" and "closed" signals. In some embodiments, the NIC 302 obtains the signals directly from the door sensor 404. In other embodiments, the meter 300 receives the signals from the door sensor 404 and the NIC 302 polls the meter 300 at predetermined intervals (e.g., approximately every 10.0 seconds) to get a current door state. For example, to track the signals received from the door sensor 404, the meter 300 can store a door state. At predetermined intervals (e.g., approximately every 2.0 seconds), the meter 300 can request an update from the door sensor 404 and can update the stored door state accordingly. Alternatively, the door sensor 404 can be configured to transmit an updated door state to the meter 300 at predetermined time intervals (e.g., approximately every 2.0 seconds).

In some embodiments, to ensure that the NIC 302 is informed of each door opening, the meter 300 can store a door state and a sticky door state. As described above, the meter 300 can update the door state each time the meter 300 receives a signal from the door sensor 404. Upon receiving a signal from the door sensor 404 indicating that the door 402 has been opened since the last signal (i.e., anytime the meter 300 changes the door state from "closed" to "open"), the meter 300 can also set the sticky door state to "open." Once the sticky door state is set it "open," the meter 300 can be restricted from updating the sticky door state until the NIC 302 has read the sticky door state. For example, the NIC 302 can be configured to read or obtain the sticky door state (e.g., approximately every 10.0 seconds) and, if the sticky door state is set to "open," the NIC 302 can be configured to clear the sticky door state to indicate that it has been informed of the door opening. It should be understood that "clearing" the sticky door sensor state can include setting the sticky door state to "closed" or "null." Once the sticky door state has been cleared, the meter 300 can update the sticky door state based on the next signal received from the door sensor 404.

Returning to FIG. 5, after the NIC 302 obtains the current door state, the NIC determines if the door 402 is open (at 502). If the door 402 is closed, the NIC 302 continues monitoring the state of the door 402 (at 502). The NIC 302 may also record the current door state in the audit log. For example, if the door was previously open and now has been closed, the NIC 302 can record the change of the door state in audit log.

Alternatively, if the door is open, NIC 302 determines if it should ignore the door opening (at 504). In particular, the NIC 302 can determine if the end-device 125 has received an "ignore" command. In some embodiments, to track whether a particular end-device 125 has received an "ignore" command or a "stop ignoring" command, the NIC 302 can manage a connect/disconnect lockout status flag (hereinafter referred simply as a "lockout status flag"). The lockout status flag can be stored in the computer-readable medium 314. In some embodiments, the lockout status flag can be a single bit that is set to "1" if the end-device 125 has received an "ignore" command and is set to "0" if the end-device 125 has not received an "ignore" command (or has most recently received a "stop ignoring" command). Upon receiving an "ignore" command, the NIC 302 can set the lockout status flag to "1." Similarly, upon receiving a "stop ignoring" command, the NIC 302 can set the lockout status flag to "0."

Therefore, the NIC 302 can use the lockout status flag to determine if is should ignore the opening of the door 402. In particular, if the lockout status flag is not set, the NIC 302 determines that the end-device 125 has not received an "ignore" command and the NIC 302 disconnects the end-device 125 from the commodity delivery network 100 based on the door opening (e.g., by instructing the meter 300 to disconnect from the network 100) (at 508). In some embodiments, the NIC 302 can also set a tamper status flag to indicate that tampering has been detected and can generate an alarm (e.g., audible or visual). As shown in FIG. 5, the NIC 302 can also record information about the disconnection in the audit log (at 510). The information can include the time and date of the disconnection and can also include a reason for the disconnection (e.g., the door 402 was opened). Furthermore, if the disconnection is not performed successfully, the NIC 302 can record any errors in the audit log.

Alternatively, if the NIC 302 determines that it should ignore the opening of the door 402 (i.e., the lockout status flag is set) (at 504), the NIC 302 can determine if the opening satisfies any specified "ignore" conditions. For example, in some embodiments, an "ignore" command can be associated with one or more "ignore" conditions. The "ignore" conditions can specify a start time for setting the lockout status flag. Similarly, the "ignore" conditions can specify an end time for unsetting the lockout status flag or a duration after the start time, at the end of which the lockout status flag should be unset. The NIC 302 uses the start time and any specified end time or duration to determine when to set the lockout status flag and when to unset the lockout status flag. It should be understood that the start and end times can include both a time and a date. Similarly, the duration can be specified in seconds, minutes, hours, days, weeks, or any other measurement of time.

Using the start time and the optional end time or duration allows the NIC 302 to be configured to only ignore signals received during a particular time period. For example, assume that the back office 210 schedules maintenance for a particular enclosure 400 for Tuesday between the hours of 1:00 a.m. and 4:00 a.m. Therefore, to ensure that the end-devices 125 only ignore openings of the door 402 during the scheduled maintenance time, the back office 210 sends the end-devices 125 an "ignore" command at 1:00 a.m. on Tuesday and a "stop ignoring" at 4:00 a.m. on Tuesday. Clearly, in some embodiments this can require precise transmission of commands from the back office 210, which may be interrupted due to communication problems or delays over the network 200.

Alternatively, the back office 210 can send an "ignore" command to the end-devices 125 at any time before 1:00 a.m. on Tuesday and can use the "ignore' conditions to specify a Tuesday, 1:00 a.m. start time and a Tuesday, 4:00 a.m. end time. Based on the "ignore" conditions, the NIC 302 can automatically set the status flag at 1:00 a.m. on Tuesday and can automatically unset the status flag at 4:00 a.m. on Tuesday without requiring further commands or signals from the back office 210.

Therefore, and returning to FIG. 5, the NIC 302 can determine if the "ignore" conditions are satisfied (at 512) by determining if the door 402 was opened at a time that falls after any specified start time and before or within any specified end time or duration. If the "ignore" conditions are not satisfied, the NIC 302 does not ignore the opening of the door 402 and disconnects the end-device 125 from the commodity delivery network 100 as described above (at 508 and 510).

Alternatively, if the "ignore" conditions are satisfied (or if no "ignore" conditions were provided), the NIC 302 ignores the opening of the door 402 and maintains the current operating state of the end-device 125 (which may be a connected state or a disconnected state) (at 514). Even if the NIC 302 ignores the opening of the door 402 and does not disconnect the end-device 125 from the commodity delivery network 100, the NIC 302 can be configured to create one or more entries in the audit log (at 510). For example, the NIC 302 can store information about the door opening (e.g., a time and a date) and may store information indicating that the opening was ignored (e.g., the "ignore" conditions that were satisfied or the fact that no "ignore" conditions were specified).

As described above, in some embodiments, once an end-device 125 is disconnected from the commodity delivery network 100 due to detected tampering, the end-device 125 remains disconnected until maintenance personnel inspect the end-device 125 and/or the enclosure 400 and the back office 210 or another authorized device connected to the network 200 issues a "connect" command. However, depending on whether an end-device 125 has received an "ignore" command, the NIC 302 may also ignore these "connect" commands. For example, if the NIC 302 ignored the opening of the door 402 and did not disconnect the end-device 125 from the commodity delivery network 100, the NIC 302 can also ignore any "connect" command issued after the door 402 was opened (e.g., if the NIC 302 has not received a "stop ignoring" command in the meantime).

Figure 6:
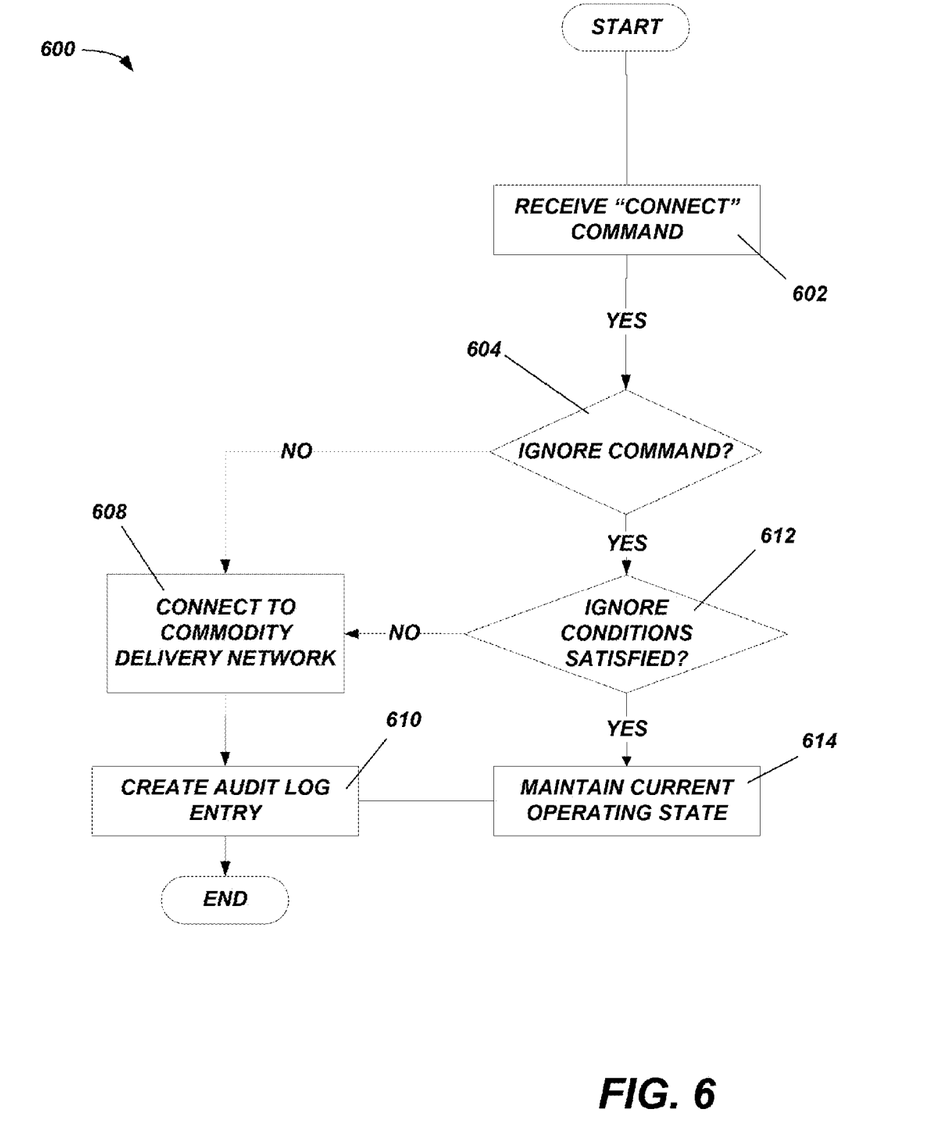
FIG. 6 is a flow chart illustrating a process for managing "connect" commands issued to an end-device.

FIG. 6 illustrates a process 600 performed by the NIC 302 to manage "connect" commands according to some embodiments of the present invention. As shown in FIG. 6, the process starts with the NIC 302 receiving a "connect" command (e.g., from the back office 210) (at 602). The NIC 302 then determines if it should ignore the "connect" command (at 604). In particular, the NIC 302 can use the lockout status flag to determine if the end-device 125 has received an "ignore" command. If the lockout status flag is not set, the NIC 302 determines that the end-device 125 has not received an "ignore" command and the NIC 302 connects the end-device 125 to the commodity delivery network 100 (e.g., by instructing the meter 300 to connect to the network 100) (at 608). In some embodiments, the NIC 302 can also unset a tamper status flag to indicate that the previously-detected tampering has been handled. Furthermore, in some embodiments, if the NIC 302 generated a tamper alarm, the NIC 302 can deactivate the alarm. As shown in FIG. 6, the NIC 302 can also record information about the connection in the audit log (at 610). The information can include the time and the date of the connection and can also include an identifier of the device (e.g., the back office 210) that issued the "connect" command. In addition, if the reconnection is not performed successfully, the NIC 302 can record any connection errors in the audit log.

Alternatively, if the NIC 302 determines that it should ignore the "connect" command (i.e., the lockout status flag is set) (at 604), the NIC 302 can determine if the "connect" command satisfies any specified "ignore" conditions (612). In particular, the NIC 302 can determine if the "connect" command was received or sent at a time that falls after any specified start time and before or within any specified end time or duration. If the "ignore" conditions are not satisfied, the NIC 302 does not ignore the "connect" command and connects the end-device 125 to the commodity delivery network 100 as described above (at 608 and 610).

Alternatively, if the "ignore" conditions are satisfied (or if no "ignore" conditions were provided to the NIC 302), the NIC 302 ignores the "connect" command and maintains the current operating state of the end-device 125 (which may be a connected state or a disconnected state) (at 614). Even if the NIC 302 ignores the "connect" command and does not connect the end-device 125 to the commodity delivery network 100, the NIC 302 can be configured to create one or more entries in the audit log (at 610). For example, the NIC 302 can store information about the "connect" command (e.g., a time and a date) and may store information indicating that the command was ignored (e.g., the "ignore" conditions that were satisfied or the fact that no "ignore" conditions were specified).

In some embodiments, the back office 210 or other authorized devices connected to the communications network 200 can also issue "disconnect" commands to one or more end-devices 125 that cause the end-devices 125 to disconnect from the network 100 (e.g., just as if the door sensor 404 indicated an opening of the door 402). For example, the back office 210 can issue a "disconnect" command to an end-device 125 associated with an end-user that has not paid for commodities consumed by the end-user over the network 100. The back office 210 can also issue a "disconnect" command to one or more end-devices 125 to allow maintenance to be performed on the end-devices 125, the enclosure 400 containing the end-devices, or other components included in the networks 100 or 200. Also, in some embodiments, the back office 210 can transmit a "disconnect" command to one or more end-devices 125 included in a particular enclosure 400 if tampering or attempted tampering of the enclosure 400 has been reported.

However, there may be situations where an end-device 125 should ignore even "disconnect" commands from back offices 210 or other devices. For example, it may be desirable to keep an end-device 125 associated with a medical clinic, a government building, or an important end-user, connected to the commodity delivery network 100 as much as possible. Therefore, the back office 210 can send an "ignore disconnect" command to the NIC 302 that instructs the NIC 302 to ignore "disconnect" commands. In some embodiments, the NIC 302 uses the lockout status flag to track whether it has received an "ignore disconnect" command. In other embodiments, the NIC 302 can use a separate status flag. For example, by using separate status flags, the NIC 302 can be configured to ignore (a) just signals generated by the door sensor 404, (b) just "disconnect" commands (e.g., issued by the back office 210), or (c) both.

In some embodiments, the "ignore disconnect" command is associated with "ignore" conditions as described above. As described above, "ignore" conditions can include a start time and an optional end time or duration. The "ignore" conditions can also include an identifier of one or more devices. The identifiers can be used to specify devices that the NIC 302 should ignore "disconnect" commands from and/or can specify devices that the NIC 302 should not ignore "disconnect" commands from (e.g., such that "disconnect" commands from all other devices will be ignored by the NIC 302). For example, the "ignore" conditions can specify an identifier of a master back office that represents that only device authorized to issue a "disconnect" command. Therefore, if the NIC 302 receives a "disconnect" command from any device other than the master back office, the NIC 302 will ignore the "disconnect" command. Accordingly, the identifiers can be used to configure a particular end-device 125 to ignore all "disconnect" commands unless the command is issued by the master back office, which is configured to issue such commands only in emergency situations. It should be understood that other types of codes and conditions may be used to inform the NIC 302 of how to handle "disconnect" commands from particular devices. Similarly, the "connect" commands described above can also be associated with similar "ignore" conditions that limit valid "connect" commands to particular authorized devices.

Figure 7:
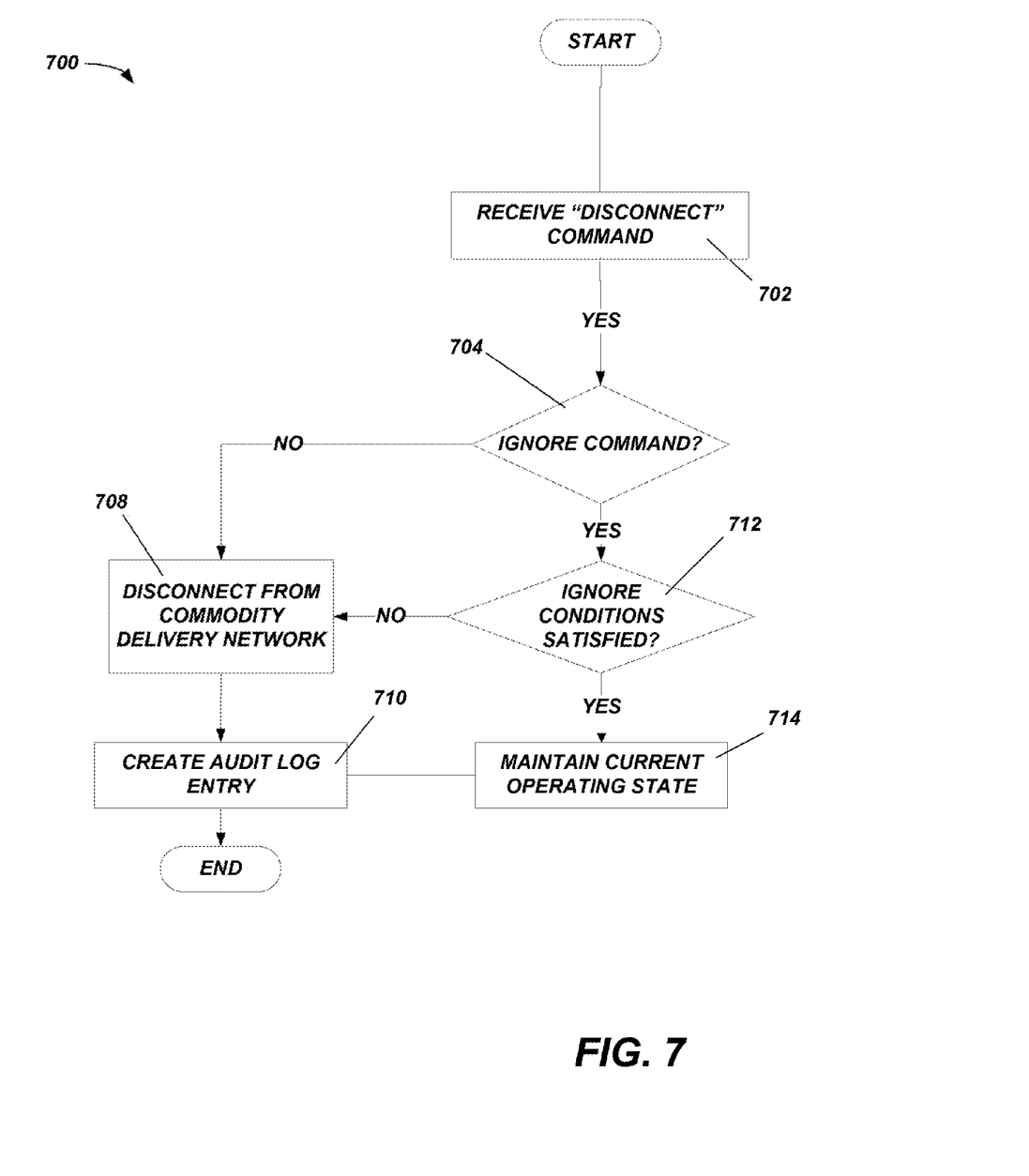
FIG. 7 is a flow chart illustrating a process for managing "disconnect" commands issued to an end-device.

FIG. 7 illustrates a process 700 performed by the NIC 302 to ignore a "disconnect" command according to some embodiments of the present invention. As shown in FIG. 7, the process starts with the NIC 302 receiving a "disconnect" command (at 702). The NIC 302 then determines if it should ignore the "disconnect" command (at 704). In particular, the NIC 302 can use the lockout status flag or, as noted above, a separate status flag, to determine whether the end-device 125 has received an "ignore disconnect" command. If the status flag is not set, the NIC 302 determines that the end-device 125 has not received an "ignore disconnect" command, and the NIC 302 disconnects the end-device 125 from the commodity delivery network 100 (e.g., similar to how the NIC 302 disconnects the end-device 125 from the network 100 when the door 402 is opened) (at 708). As shown in FIG. 7, the NIC 302 can also record information about the disconnection in the audit log (at 710). The information can include the time and the date of the disconnection and can also include an identifier of the device that issued the "disconnect" command. In addition, if the disconnection is not performed successfully, the NIC 302 can record any errors in the audit log.

Alternatively, if the NIC 302 determines that it should ignore the "disconnect" command (i.e., the applicable status flag is set) (at 704), the NIC 302 can determine if the "disconnect" command satisfies any specified "ignore" conditions (712). In particular, the NIC 302 can determine if the "disconnect" command was received or sent at a time that falls after any specified start time and before or within any specified end time or duration. As described above, the NIC 302 can also determine if the "disconnect" command was sent by a device that the NIC 302 is configured to ignore based on the "ignore" conditions. If the "ignore" conditions are not satisfied, the NIC 302 does not ignore the "disconnect" command and disconnects the end-device 125 from the commodity delivery network 100 as described above (at 708 and 710).

Alternatively, if the "ignore" conditions are satisfied (or if no "ignore" conditions were provided to the NIC 302), the NIC 302 ignores the "disconnect" command and maintains the current operating state of the end-device 125 (which may be a connected state or a disconnected state) (at 714). Even if the NIC 302 ignores the "disconnect" command and does not disconnect the end-device 125 from the commodity delivery network 100, the NIC 302 can be configured to create one or more entries in the audit log (at 710). For example, the NIC 302 can store information about the "disconnect" command (e.g., a time and a date) and information indicating that the command was ignored (e.g., the "ignore" conditions that were satisfied or the fact that no "ignore" conditions were specified).

It should be understood that even if a particular end-device 125 remains connected to the commodity delivery network 100 because the end-device 125 has received an "ignore" command or an "ignore disconnect" command, maintenance personnel may still be able to physically disconnect the end-device 125 from the network 100 at the "line side" of the end-device 125 using a circuit breaker or similar device. Therefore, maintenance can still be safely performed even if particular end-devices 125 do not automatically disconnect from the network 100 when maintenance personnel open the door 402 of the enclosure 400.

Various features and advantages of the invention are set forth in the following claims.

What is claimed is:

1. A computer-implemented method for managing an end-device connected to a commodity delivery system, the end-device included in an enclosure including a door, the method comprising:
   determining, with a network interface controller, if the door is open;
   when the door is open, determining, with the network interface controller, if the end device is in an ignore mode;
   automatically, with the network interface controller, disconnecting the end-device from the commodity delivery system when the door is open and the end-device is not in an ignore mode; and
   maintaining, with the network interface controller, a current operating state of the end-device when the door is open and the end-device is in an ignore mode.

2. The method of claim 1, further comprising:
   receiving, at the network interface controller, an "ignore" command for the end-device;
   placing, with the network interface controller, the end-device in the ignore mode based on the "ignore" command;
   receiving, at the network interface controller, a "stop ignoring" command for the end-device; and
   placing, with the network interface controller, the end-device out of the ignore mode based on the "stop ignoring" command.

3. The method of claim 1, further comprising:
   creating, with the network interface controller, an audit log entry; and
   transmitting the audit log entry to at least one back office over at least one communication network, wherein the audit log includes at least one of a date and a time that the door was open and a data and time of disconnecting the end-device from the commodity delivery network.

4. The method of claim 1, further comprising:
receiving, at the network interface controller, a "connect" command for the end-device;
determining, with the network interface controller, if the end-device is in an ignore mode;
automatically, with the network interface controller, connecting the end-device to the commodity delivery system based on the "connect" command when the end-device is not in an ignore mode; and
maintaining, with the network interface controller, a current operating state of the end-device based on the "connect" command when the end-device is in an ignore mode.

5. The method of claim 1, further comprising:
receiving, at the network interface controller, a "disconnect" command for the end-device;
determining, with the network interface controller, if the end-device is in an ignore mode;
automatically, with the network interface controller, disconnecting the end-device from the commodity delivery system based on the "disconnect" command when the end-device is not in an ignore mode; and
maintaining, with the network interface controller, a current operating state of the end-device based on the "disconnect" command when the end-device is in an ignore mode.

6. The method of claim 1, wherein maintaining, with the network interface controller, the current operating state of the end-device includes maintaining, with the network interface controller, the current operating state of the end-device when the door is open, the end-device is in an ignore mode, and at least one ignore condition is satisfied.

7. The method of claim 6, wherein determining if the at least one ignore condition is satisfied includes determining if the door is open at a time after a predetermined start time.

8. The method of claim 6, wherein determining if the at least one ignore condition is satisfied includes determining if the door is open at a time after a predetermined start time and before a predetermined end time.

9. The method of claim 6, wherein determining if the at least one ignore condition is satisfied includes determining if the door is open at a time within a predetermined duration after a predetermined start time.

10. The method of claim 1, wherein determining, with the network interface controller, if the door is open includes receiving a signal from a door sensor.

11. The method of claim 1, wherein determining, with the network interface controller, if the door is open includes reading a door state set by a meter included in the end-device, wherein the meter receives a signal from a door sensor.

12. A system for managing an end-device connected to a commodity delivery system, the system comprising:
a network interface controller configured to;
determine if a door of an enclosure that includes the end-device is open,
when the door is open, determine if the end-device is in an ignore mode,
automatically disconnect the end-device from the commodity delivery system when the door is open and the end-device is not in an ignore mode, and
maintain a current operating state of the end-device when the door is open and the end-device is in an ignore mode.

13. The system of claim 12, further comprising a door sensor configured to transmit a signal indicating if the door is open or closed.

14. The system of claim 13, wherein the network interface controller determines if the door is open based on the signal transmitted by the door sensor.

15. The system of claim 12, wherein the network interface controller is further configured to receive an "ignore" command for the end-device and to place the end-device in the ignore mode based on the "ignore" command and to receive a "stop ignoring" command for the end-device and to place the end-device out of the ignore mode based on the "stop ignoring" command.

16. The system of claim 12, wherein the network interface controller is further configured to create an audit log entry and transmit the audit log entry to at least one back office over at least one communication network, wherein the audit log entry includes at least one of a date and a time that the door was open and a date and a time that the end-device was disconnected from the commodity delivery network.

17. The system of claim 12, wherein the network interface controller is further configured to maintain the current operating state of the end-device when the door is open, the end-device is in an ignore mode, and at least one ignore condition is satisfied.

18. The system of claim 17, wherein the at least one ignore condition includes a start time and the at least one ignore condition is satisfied if the door is open at a time after the start time.

19. The system of claim 17, wherein the at least one ignore condition includes a start time and an end time and the at least one ignore condition is satisfied if the door is open at a time after the start time and before the end time.

20. The system of claim 17, wherein the at least one ignore condition includes a start time and a duration and the at least one ignore condition is satisfied if the door is open at a time within the duration after the start time.

21. A non-transitory computer-readable storage medium including instructions that, when executed by a processor, cause the processor to manage an end-device connected to a commodity delivery system, by performing the steps of:
determining if a door of an enclosure that includes the end-device is open;
when the door is open, determining if the end device is in an ignore mode;
automatically disconnecting the end-device from the commodity delivery system when the door is open and the end-device is not in an ignore mode; and
maintaining a current operating state of the end-device when the door is open and the end-device is in an ignore mode.

22. The device of claim 21, wherein the instructions further include instructions for receiving an "ignore" command for the end-device and placing the end-device in the ignore mode based on the "ignore" command and instructions for receiving a "stop ignoring" command for the end-device and placing the end-device out of the ignore mode based on the "stop ignoring" command.

23. The device of claim 21, wherein the instructions for detecting tampering of the end-device include instructions for determining when a door of an enclosure containing the end-device is open.

24. The device of claim 21, wherein the instructions for detecting tampering of the end-device include instructions for receiving a "disconnect" command.

25. The device of claim 21, wherein the instructions further include instructions for generating an audit log entry and transmitting the audit log entry to at least one back office over at least one communication network.

* * * * *